(12) United States Patent
Lunz

(10) Patent No.: US 6,315,486 B1
(45) Date of Patent: Nov. 13, 2001

(54) JOINT MOUNTED ON ROLLING BEARINGS

(75) Inventor: Erich Lunz, Lonnerstadt (DE)

(73) Assignee: INA Walzlager Schaeffler oHG (DE)

( * ) Notice: Subject to any disclaimer, the term of this patent is extended or adjusted under 35 U.S.C. 154(b) by 0 days.

(21) Appl. No.: 09/380,867

(22) PCT Filed: Feb. 5, 1998

(86) PCT No.: PCT/EP98/00613

§ 371 Date: Sep. 8, 1999

§ 102(e) Date: Sep. 8, 1999

(87) PCT Pub. No.: WO98/41773

PCT Pub. Date: Sep. 24, 1998

(30) Foreign Application Priority Data

Mar. 15, 1997 (DE) .............................................. 197 10 866

(51) Int. Cl.$^7$ .................................................... F16C 11/06
(52) U.S. Cl. ............................................ 403/127; 403/114
(58) Field of Search ................................... 403/122, 121, 403/127, 128, 131, 141, 143, 114, 115

(56) References Cited

U.S. PATENT DOCUMENTS

| | | |
|---|---|---|
| 1,959,563 | 5/1934 | Baker . |
| 2,641,492 | 6/1953 | Flumerfelt . |
| 2,971,770 * | 2/1961 | Wagner ............................. 403/127 X |
| 3,068,032 * | 12/1962 | Van Winsen ..................... 403/127 X |
| 4,459,122 * | 7/1984 | Rehfeld ............................ 403/114 X |
| 4,986,689 * | 1/1991 | Drutchas .............................. 403/127 |
| 4,995,755 * | 2/1991 | Hyodo et al. .................... 403/131 X |
| 6,071,031 * | 6/2000 | Bailey ............................. 403/122 X |

FOREIGN PATENT DOCUMENTS

| | | |
|---|---|---|
| 8990033 | 3/1953 | (DE) . |
| 3605583 | 8/1986 | (DE) . |
| 19617880 | 10/1996 | (DE) . |

* cited by examiner

Primary Examiner—Harry C. Kim
(74) Attorney, Agent, or Firm—Bierman, Muserlian and Lucas

(57) ABSTRACT

A joint with a pin (1) comprising an inner member (2), a center member (6), a housing body (8) and a flange ring (12) arranged in one another via rolling bearings (4,5,10,13,14, 18,19,20) for pivoting or rotating about their rotational axis (3,7,15) which advantageously create a rolling bearing-mounted joint which has a high rigidity and a comparatively low frictional and pivoting resistance useful for achieving a high positioning precision in machine tools of a hexapod system.

8 Claims, 4 Drawing Sheets

JOINT MOUNTED ON ROLLING BEARINGS

FIELD OF THE INVENTION

The invention concerns a joint having a pin which carries an element that is received via a rolling bearing for pivoting in an associated housing.

BACKGROUND OF THE INVENTION

If the element that receives the pin is spherical in shape and pivotable in a socket, these joints are called ball-and-socket joints. Such a rolling bearing-mounted ball-and-socket joint is known from U.S. Pat. No. 2,971,770. The pin is rotatably secured by a ball bearing to the flat undersurface of the spherical element which is mounted with its semi-spherical surface through a plurality of small bearing balls for pivoting in a spherical recess. Ball-and-socket joints of this type are used in the field of front wheel suspensions of automotive vehicles. The drawback of these rolling bearing-mounted ball-and-socket joints is, on the one hand, that due to the pointwise contact of the spherical element with a plurality of small bearing balls, high Hertzian stresses occur and, on the other hand, these joints possess an inadequate rigidity.

However, in addition to the automotive industry, other uses are also conceivable in which a low rigidity of the joints is undesirable. This is the case in the sector of machine tools when omnidirectionally orientable joints are used for the positioning of tools. In this case, joints are required that can effect a pin-point positioning of a tool.

SUMMARY OF THE INVENTION

It is therefore the object of the invention to create a rolling bearing-mounted joint which avoids the drawbacks of prior art ball-and-socket joints while at least attaining their angles of pivot.

The invention achieves this object by a pin (1) that is received by an inner member (2), this inner member (2) is received via rolling bearings (4,5,19,20) arranged on its outer peripheral surface for pivoting about its rotational axis (3) in a center member (6), this center member (6) is received offset at 90° to the rotational axis (3) of the inner member (2) via rolling bearings (9,10) arranged on its outer peripheral surface for pivoting about its rotational axis (7) in a housing body (8), and the housing body (8) is mounted offset at 900 to the rotational axis (3) of the inner member 92) and to the rotational axis (7) of the center member (6) in a flange ring (12) via rolling bearings (13,14,18) arranged on its outer peripheral surface for rotation about its rotational axis (15), the rotational axis (3,7,15) of the inner member (2), the center member (6) and the housing body (8) starting from a common point.

The technical improvement that can be attained with the inventive configuration of the joint resides particularly in its high rigidity and the resulting high positioning precision.

The rolling bearings provided between the individual components of the joint advantageously guarantee a comparatively low frictional resistance and thus also a low pivoting resistance while, at the same time, at least the pivoting ability of a conventional ball-and-socket joint is attained.

The center member has a disc-shaped configuration and is pivotally mounted with the help of two opposing angular needle bearings arranged back-to-back. By angular needle bearings is meant that the effective direction of the force of pressure applied to each rolling element is inclined relative to the longitudinal axis of the pin. Due to their radial compactness, the used needle bearings guarantee a particularly space-saving spatial arrangement.

The different configurations of the inner member which receives the pin are as follows. In one case, the inner member is disc-shaped and mounted with the help of two opposing angular needle bearings arranged face-to-face, or the inner member is spherical in shape and mounted with the help of two angular needle bearings arranged back-to-back.

The housing body which receives the inner member and the center member is mounted for rotation i the flange ring with the help of a cross roller bearing or by two opposing angular needle bearings arranged face-to-face. Both types of mounting are equally feasible.

According to a further feature of the invention, the rolling bearings are pre-stressed. This pre-stress prevents a radial displacement of the components of the joint arranged in one another so that a particularly high positioning precision can be achieved.

The housing body, the center member and the inner member are each made of two pieces and joined together by fixing screws to form a unit. Thus two-piece configuration assures the easy assembly of the rolling bearing-mounted joint.

Finally, the rolling bearing-mounted joint is used in machine tools of the hexapod system. These machine tools of a new generation are known to the person skilled in the art and, in contrast to conventional machine tools, they move small masses. The result of this is that higher adjusting speeds are reached and, particularly, the rigidity between the frame and the tool holder is very high. Such a machine tool can comprise a plurality of arms which are articulated at one end on a frame and at the other end, on a tool holder. The rolling bearing-mounted joints of the invention can be used advantageously in this type of machine tools.

The invention will now be described more closely with reference to the following examples of embodiment.

DETAILED DESCRIPTION OF THE DRAWINGS

Figure 1:
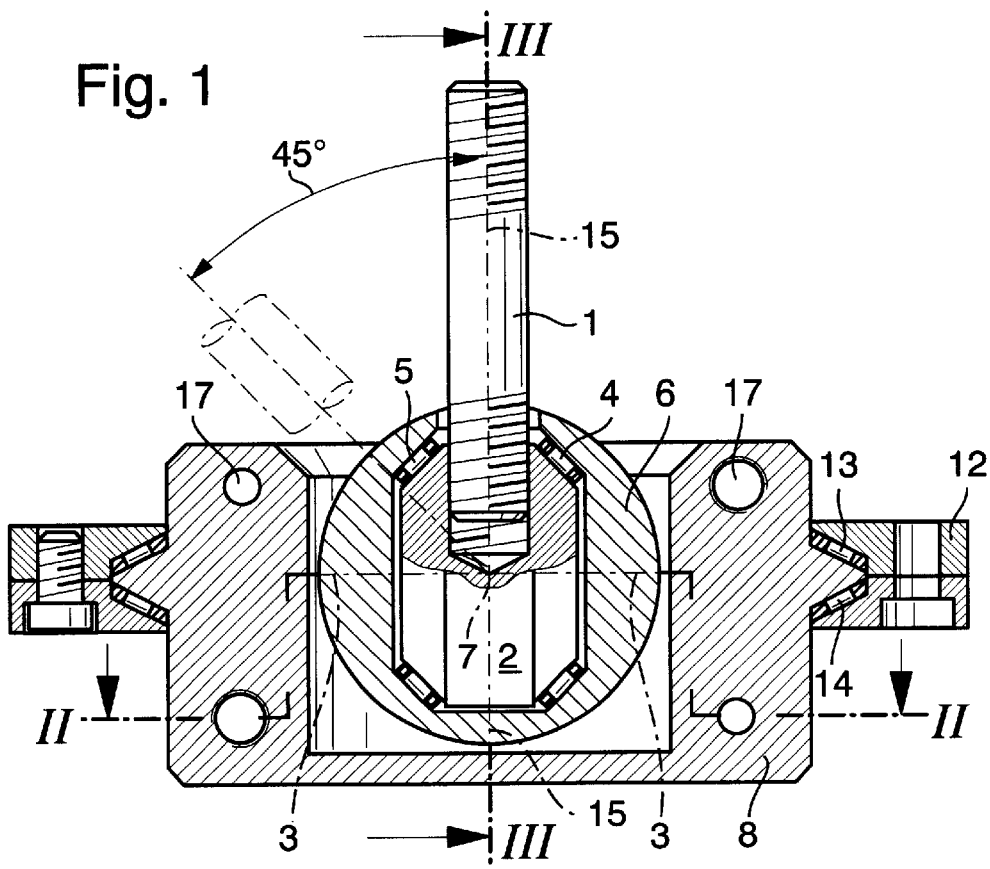
FIGS. 1, 4 and 5 are longitudinal sections through a rolling bearing-mounted joint, taken along the rotational axis of the housing body.
Figure 2:
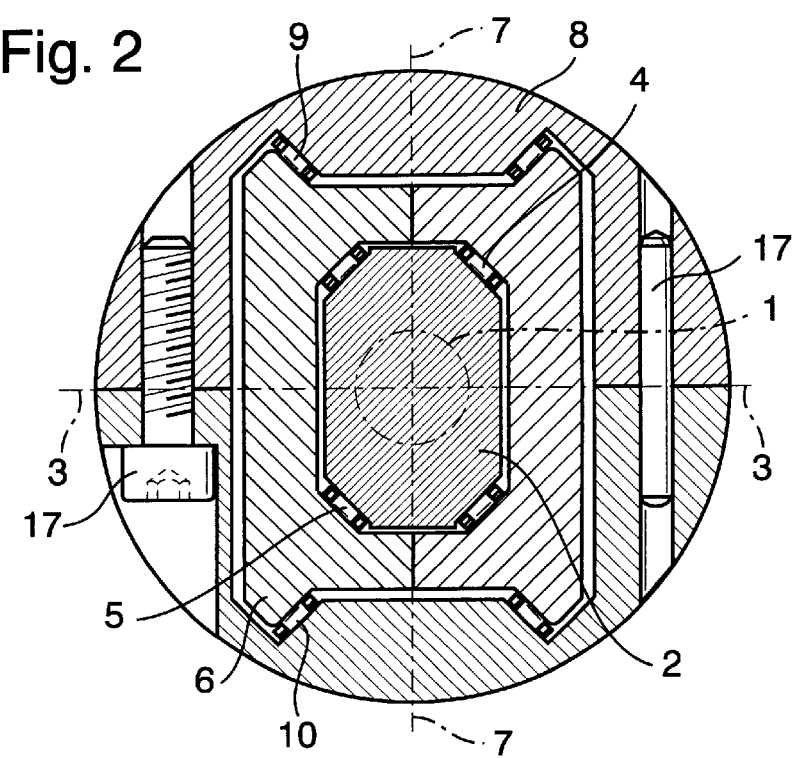
FIGS. 2 and 3 are sections taken along lines II—II and III—III respectively, of FIG. 1, FIGS. 6 and 7 are sections taken along lines VI—VI and VII—VII respectively, of FIG. 5.
Figure 3:
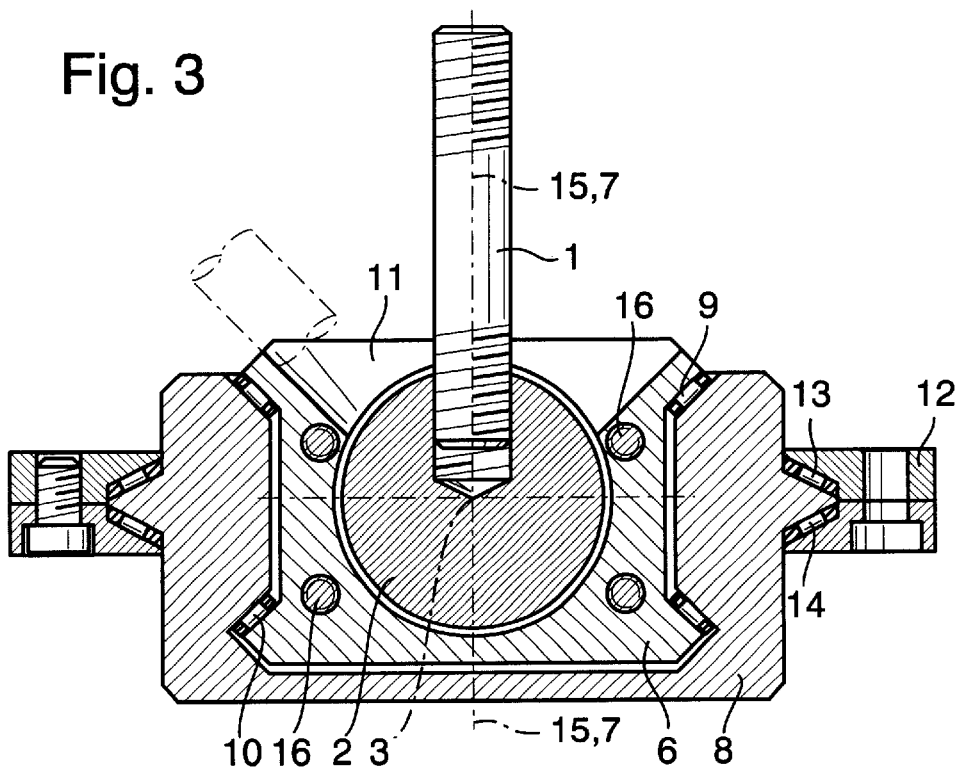

The joint shown in FIGS. 1 to 3 in different sectional views comprises a pin 1 which is received by an inner member 2. This inner member 2 is disc-shaped and receives the pin 2 with an offset of 90° to its rotational axis 3. The outer peripheral surface of the inner member drops obliquely outwards at its opposing axial ends so that two tracks extending at an acute angle to the rotational axis 3 are formed for two angular needle bearings 4, 5. With the aid of these angular needle bearings 4, 5, the inner member 2 together with the pin 1 is arranged for pivoting in a center member 6. The inner member 2 is retained by the two angular needle bearings 4, 5 which are arranged face-to-face.

The center member 6 which receives the inner member 2 is again arranged with an offset of 90° to the rotational axis 3 of the inner member 2 for pivoting about its own axis 7 in a housing body 8. For this purpose, the center member 6 comprises on its outer peripheral surface, two tracks which drop inwards at an acute angle to the rotational axis 7 for receiving two angular needle bearings 9, 10 which are arranged back-to-back and retain the center member 6. In direction towards the pin 1, the center member 6 comprises a recess 11 on its upper end which enables a pivoting of the pin 1 within the center member 6.

The housing body 8 is arranged in a flange ring 12 with the help of two angular needle bearings 13, 14 in face-to-face arrangement for rotation about its rotational axis 15. The individual components, inner member 2, center member 6 and housing body 8, are inter-inserted in such a way that their rotational axes 3, 7 and 15 intersect one another at a common point, i.e. all three bearing center points are situated at the same point. It can be seen further from the three mentioned figures that the center member 6 and the housing body 8 are two-pieced and are joined together by fixing screws 16, 17 to form a unit.

Figure 4:
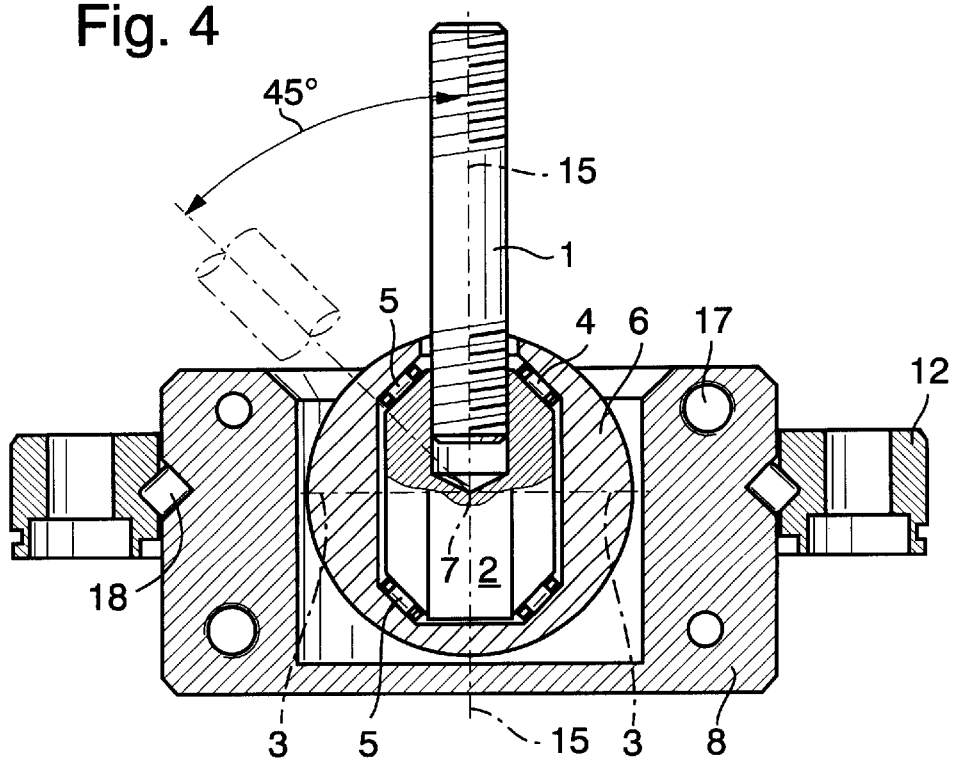

The difference between FIG. 1 and FIG. 4 is that the joint shown in the latter is retained in the flange ring 12 with the help of a cross roller bearing 18. Due to this threefold mounting of the joint on rolling bearings with the described advantages of rolling bearing-mounting, the pin 1, similar to a ball-and-socket joint, can take any position on an associated spherical cap.

Figure 5:
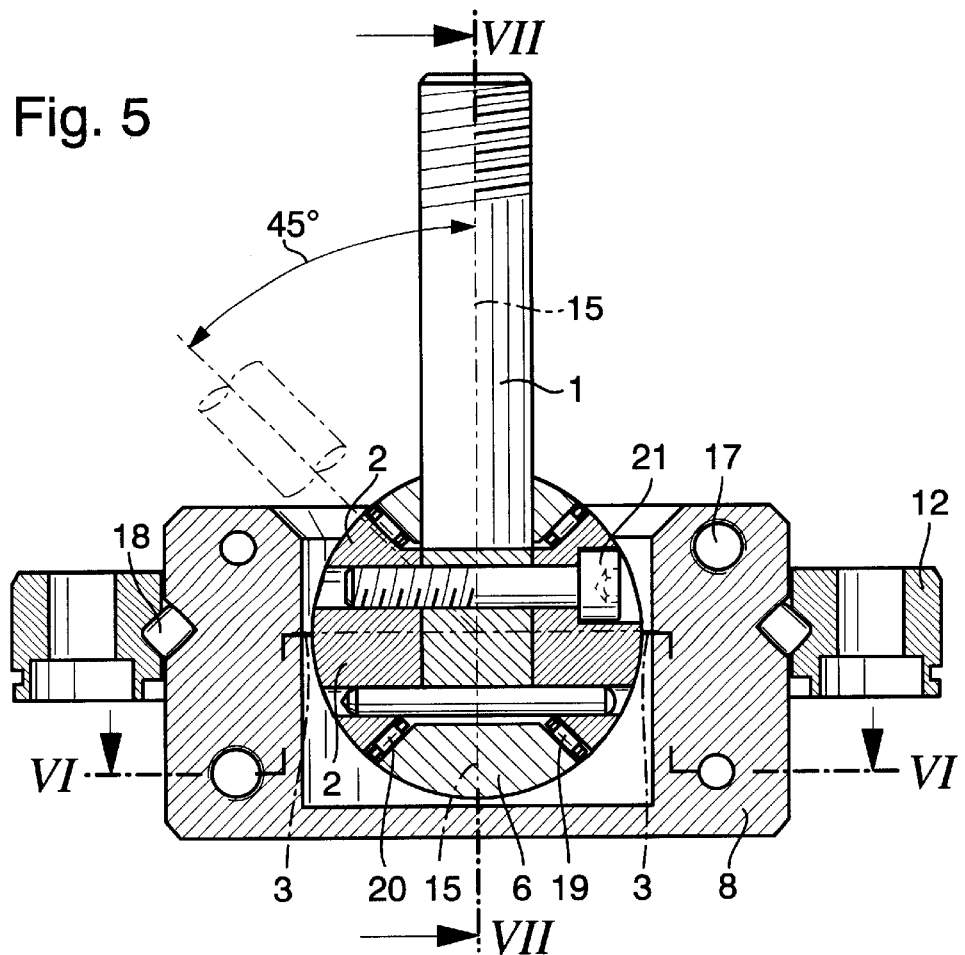
Figure 6:
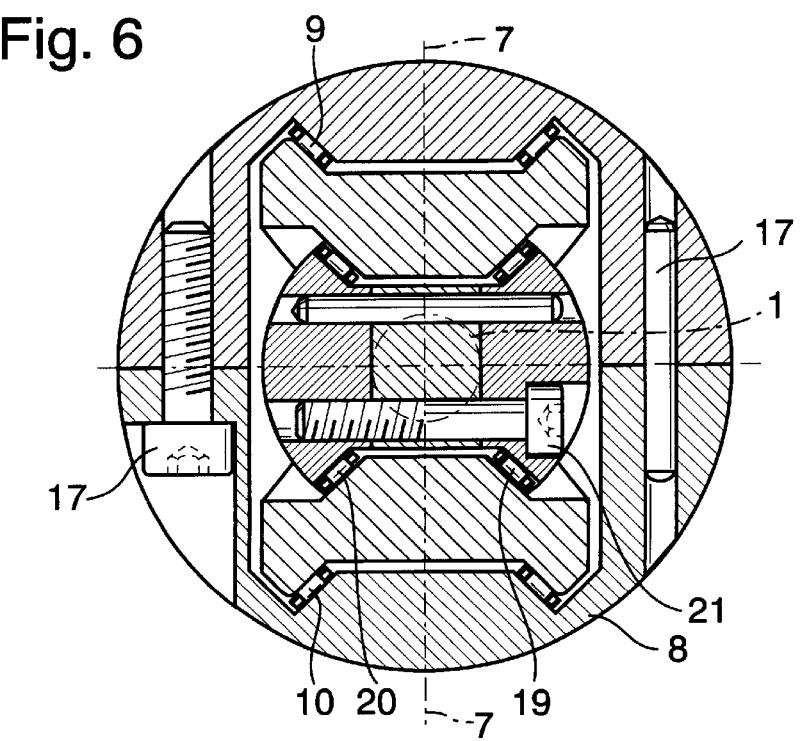
Figure 7:
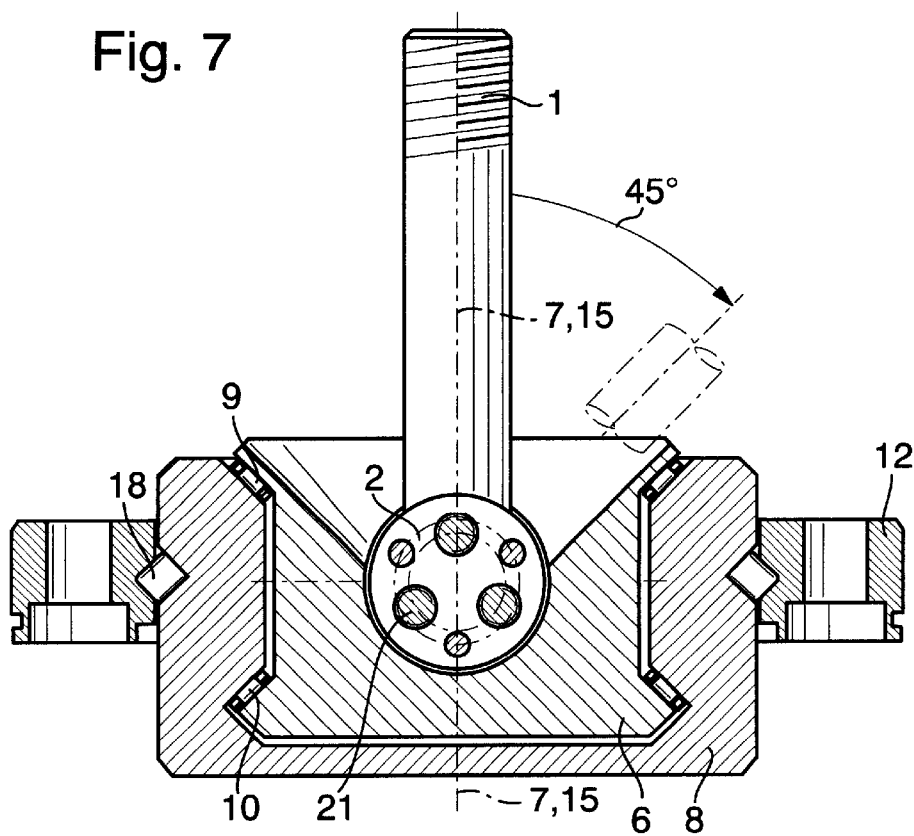

The joint shown in FIGS. 5 to 7 distinguishes itself by the fact that the inner member 2, which is made up of two parts connected to each other by fixing screws 21, is spherical in shape and is mounted for pivoting about its rotational axis 3 by two angular needle bearings 19, 20 arranged back-to-back.

Figure 8:
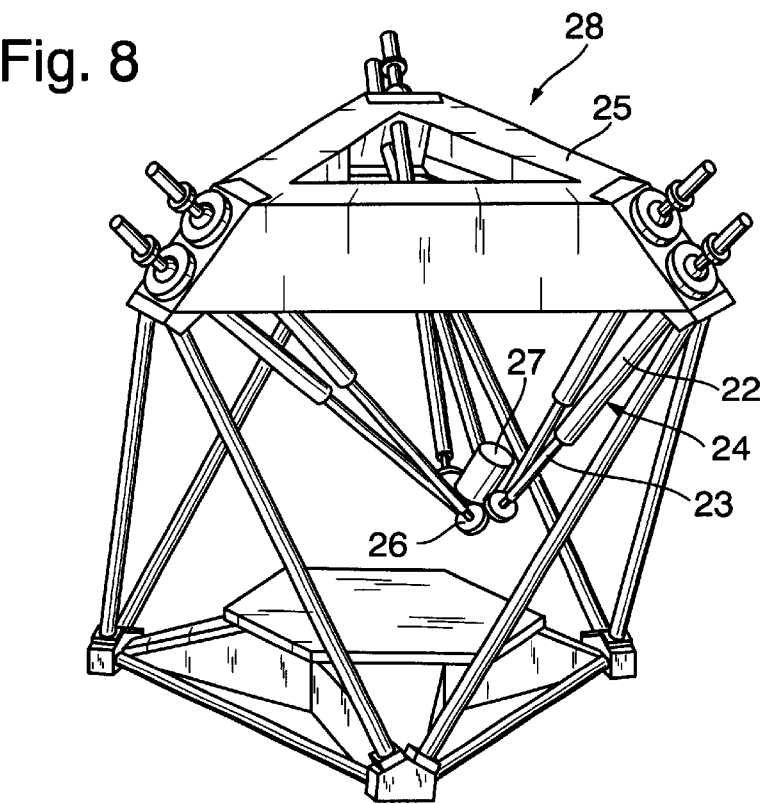
FIG. 8 is a schematic representation of a machine tool of the hexapod system.

The machine tool 28 shown in FIG. 8 comprises a plurality of telescopic arms 24 each of which is formed by inter-inserted tubes 22, 23. These telescopic arms 24 are articulated at one end on a frame 25 and at the other end, on a tool holder 26. The tool holder 26 is provided with a tool, not shown, which is driven by a motor 27. By retracting or extending one or more of the telescopic arms 24, the tool holder 26 can be moved into any desired position in space. In the machine tool 28 represented in FIG. 8, the inventive joints can be used advantageously both on the frame 25 and on the tool holder 26.

What is claimed is:

1. A joint having a pin (1) carrying an element that is received via a rolling bearing for pivoting in an associated housing, wherein the pin (1) is received by an inner member (2), this inner member (2) is received via inner member four rolling bearings (4,5,19,20) arranged on its outer peripheral surface for pivoting about its rotational axis (3) in a center member (6), this center member (6) is received offset at 90° to the rotational axis (3) of the inner member (2) via center member rolling bearings (9,10) arranged on its outer peripheral surface for pivoting about its rotational axis (7) in a housing body (8) which is mounted offset at 90° to the rotational axis (3) of the inner member (2) and to the rotational axis (7) of the center member (6) in a flange ring (12) via housing body rolling bearings (13,14,18) arranged on its outer peripheral surface for rotation about its rotational axis (15), the rotational axes (3,7,15) of the inner member (2), the center member (6) and the housing body (8) starting from a common point.

2. The joint according to claim 1 wherein the center member (6) has a disc-shaped configuration and is pivotally mounted by two opposing center member angular needle bearings (9,10) arranged back-to-back.

3. The joint according to claim 1 wherein the inner member (2) is disc-shaped and is pivotally mounted by two opposing inner member angular needle bearings (4,5) arranged face-to-face on its outer peripheral surface.

4. The joint according to claim 1 wherein the inner member (2) is spherical in shape and is pivotally mounted by two inner member angular needle bearings (19,20) arranged back-to-back on its outer peripheral surface.

5. The joint according to claim 1 wherein the housing body (8) is mounted for rotation in the flange ring (12) by a housing body cross roller bearing (18) or by two housing body opposing angular needle bearings (13,14) arranged face-to-face.

6. The joint according to claim 1 wherein all the rolling bearings (4,5,9,10,13,14,18,19,20) are pre-stressed.

7. The joint according to claim 1 wherein the housing body (8), the center member (6) and the inner member (2) are each made of two pieces and joined together by fixing screws (17,16,21,) to form a unit.

8. The joint according to claim 1 wherein it is used in machine tool (28) of hexapod system.

* * * * *